United States Patent
Dutta et al.

(10) Patent No.: US 9,632,958 B2
(45) Date of Patent: Apr. 25, 2017

(54) SYSTEM FOR MIGRATING STASH TRANSACTIONS

(71) Applicants: Yashpal Dutta, New Delhi (IN);
Himanshu Goel, Ghaziabad (IN);
Varun Sethi, New Delhi (IN)

(72) Inventors: Yashpal Dutta, New Delhi (IN);
Himanshu Goel, Ghaziabad (IN);
Varun Sethi, New Delhi (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 551 days.

(21) Appl. No.: 14/324,233

(22) Filed: Jul. 6, 2014

(65) Prior Publication Data

US 2016/0004654 A1    Jan. 7, 2016

(51) Int. Cl.
*G06F 3/00*    (2006.01)
*G06F 13/00*    (2006.01)
*G06F 13/28*    (2006.01)
*G06F 12/00*    (2006.01)

(52) U.S. Cl.
CPC .............. *G06F 13/28* (2013.01); *G06F 3/00* (2013.01); *G06F 12/00* (2013.01); *G06F 13/00* (2013.01)

(58) Field of Classification Search
USPC ....... 710/22, 52, 55, 305, 308; 711/118, 119
See application file for complete search history.

(56) References Cited

U.S. PATENT DOCUMENTS

| | | | |
|---|---|---|---|
| 5,222,224 A | 6/1993 | Flynn | |
| 7,773,597 B2 | 8/2010 | Chen | |
| 7,774,522 B2 | 8/2010 | Bouvier | |
| 7,895,431 B2 | 2/2011 | Bouchard | |
| 8,180,973 B1 | 5/2012 | Armangau et al. | |
| 8,266,379 B2 | 9/2012 | Lee | |
| 8,412,886 B2 | 4/2013 | Kiyota | |
| 8,429,315 B1 | 4/2013 | Chudgar et al. | |
| 8,514,232 B2 | 8/2013 | Mejdrich et al. | |
| 8,521,963 B1 * | 8/2013 | Miao et al. | 711/141 |
| 8,671,232 B1 | 3/2014 | Garg et al. | |
| 2005/0021931 A1 | 1/2005 | Anderson et al. | |
| 2011/0066830 A1 | 3/2011 | Wolfe | |
| 2012/0173819 A1 | 7/2012 | Solihin | |
| 2013/0097382 A1 * | 4/2013 | Kurihara et al. | 711/121 |
| 2013/0111138 A1 | 5/2013 | Suzuki et al. | |
| 2013/0297888 A1 | 11/2013 | Yamashita et al. | |
| 2015/0039833 A1 * | 2/2015 | Chang et al. | 711/129 |
| 2015/0234687 A1 * | 8/2015 | Vajapeyam | 711/129 |

\* cited by examiner

*Primary Examiner* — Khanh Dang
(74) *Attorney, Agent, or Firm* — Charles E. Bergere

(57) ABSTRACT

A system for migrating stash transactions includes first and second cores, an input/output memory management unit (IOMMU), an IOMMU mapping table, an input/output (I/O) device, a stash transaction migration management unit (ST-MMU), a queue manager and an operating system (OS) scheduler. The I/O device generates a first stash transaction request for a first data frame. The queue manager stores the first stash transaction request. When the first core executes a first thread, the queue manager stashes the first data frame to the first core by way of the IOMMU. The OS scheduler migrates the first thread from the first core to the second core and generates pre-empt notifiers. The STMMU uses the pre-empt notifiers to update the IOMMU mapping table and generate a stash replay command. The queue manager receives the stash replay command and stashes the first data frame to the second core.

18 Claims, 3 Drawing Sheets

SYSTEM FOR MIGRATING STASH TRANSACTIONS

BACKGROUND OF THE INVENTION

The present invention generally relates to multi-core processor systems, and, more particularly, to a system and a method for dynamically migrating stash transactions in multi-core processor systems used in a computer network.

Multi-core processor systems include one or more central processing units (CPUs), each of which may have multiple processor cores. The multiple cores of the CPUs use shared memory and input/output resources for processing data. Multi-core processor systems are known for high processing speeds that render them useful for data intensive applications. By virtue of their multi-core architecture, the CPUs can execute several instructions simultaneously, which considerably increases processing speed. This processing speed can be further increased by stashing, which entails use of a cache memory. The cache memory is a small, but fast local memory having limited storage capacity. Since cache access times are less than those of main memories, frequently accessed data is stored in the cache memory, which reduces processing time and latency associated with instructions that require loading/storing of data.

The multi-core processor systems by virtue of their processing prowess are used as servers in computer networks such as Ethernet local area networks (LANs). The CPUs of these multi-core processor systems used as servers process packets received from input/output (I/O) devices. The packets are stored in a buffer. An input output memory management unit (IOMMU) assigns a stash transaction destination identification (ID) to each packet based on the packet originating I/O device. The stash transaction destination ID includes a cache register ID of a processor core associated with the packet originating I/O device. Stash transactions are then initiated and the packets are broadcast to the various processor cores for processing. Stashing the packets in the respective cache memories of the processor cores ensures faster accesses times and thus reduced latency.

The multiple processor cores simultaneously execute different packets as threads. To efficiently manage power in the above setting, an operating system (OS) scheduler is used. The OS scheduler migrates, i.e., schedules-in and schedules-out, the threads from one core to another. The thread migration is performed in a manner that prevents any of the cores from being overloaded.

Thread migration is also essential for ensuring power efficiency in a multi-core processor system. If the multi-core processor system is under-utilized, the OS scheduler may choose to migrate threads to a single processor core and power-down the other processor cores. This will reduce power consumption. However, thread migration is challenging in systems that intend to benefit from stashing. Since the processor core to which a stash transaction will be directed is fixed at I/O device initialization, thread migration at a later stage of processing becomes cumbersome. This inflexibility may prevent the OS scheduler from effectively managing power and balancing load across the processor cores. Further, a processor core that executes the thread after thread migration has to access cache data related to the thread from a processor core that previously executed the thread. However, due to the aforementioned disadvantages, a read-miss occurs on the cache data and the processor core that executes the thread after thread migration has to access the cache data from the processor core that previously executed the thread by performing a snooping operation. The snooping operation increases the thread execution time since the processor core halts instructions that are in the pipeline until the cache data has been retrieved from the processor core that previously executed the thread. Hence, the overall system performance decreases.

Therefore, it would be advantageous to have a system and method that enables dynamic migration of stash transactions without snooping of cache data, and enables thread migration.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
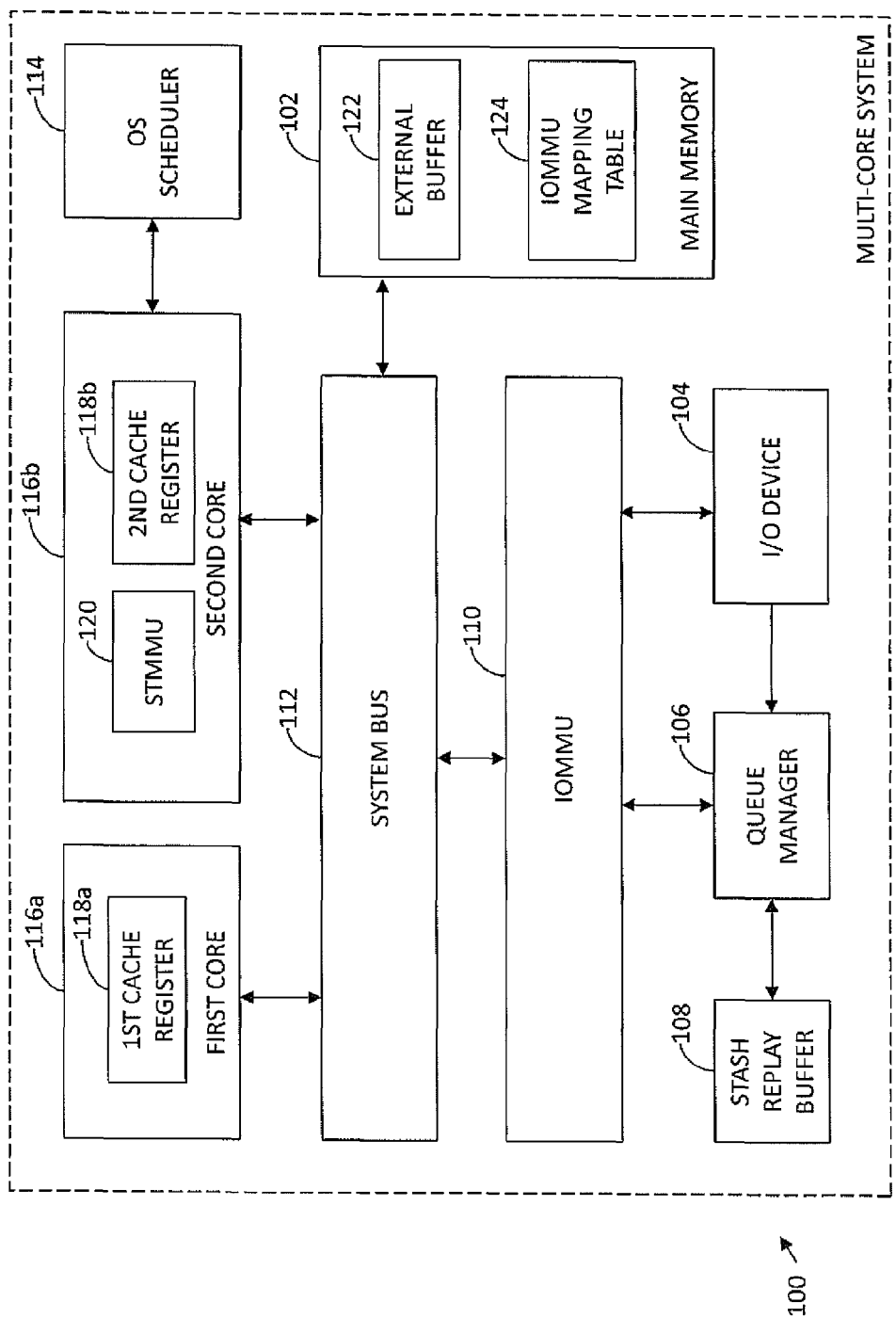
FIG. 1 is a schematic block diagram of a system for migrating stash transactions between a plurality of processor cores of a multi-core processor system, in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for migrating at least one stash transaction between a plurality of processor cores is provided. Each of the plurality of processor cores includes a cache register. The system includes a main memory, a first I/O device, a queue manager, a stash transaction migration management unit (STMMU), and an input/output memory management unit (IOMMU). The main memory stores a plurality of data frames and an IOMMU mapping table that includes a mapping between a logical input/output (I/O) device number (LIODN) corresponding to an I/O device and a corresponding stash transaction destination identification (ID). The stash transaction destination ID includes a cache register ID associated with a cache register of one of the processor cores of the plurality of processor cores. The first I/O device is connected to the main memory. The first I/O device generates the plurality of data frames and initiates direct memory access (DMA) transactions for storing the plurality of data frames in the main memory, and generates a stash transaction request corresponding to each data frame of the plurality of data frames. The queue manager is connected to the first I/O device. The queue manager receives and stores a first stash transaction request corresponding to a first data frame of the plurality of data frames, generates a first stash transaction command based on the first stash transaction request, and re-generates the first stash transaction command when a stash replay command is received. The STMMU is connected to the main memory and the queue manager. The STMMU determines a first processor core ID of a first processor core that executes a first thread associated with the first I/O device when the first thread is scheduled-out from the first processor core, determines a second processor core ID of a second processor core that executes the first thread after the first thread is scheduled-in, compares the first and second processor core IDs, updates a stash transaction destination ID field of the IOMMU mapping table corresponding to the first I/O device when the first and second processor core IDs are different by replacing a first stash transaction destination ID with a second stash transaction destination ID, and generates the stash replay command when the first and second processor core IDs are different, wherein the first stash transaction destination ID includes a first cache register ID associated with a cache register of the first processor core and the second stash transaction destination ID includes a second cache register ID associated with a cache register of the second processor core. The IOMMU is connected to the main memory, the first I/O device, the queue manager, and the plurality of processor cores. The IOMMU validates the DMA transactions initiated by the first I/O device using a LIODN associated with the first I/O device, and determines a stash destination for the first stash transaction command received from the queue manager by accessing the IOMMU mapping table. The IOMMU determines the cache register of the first processor core as the stash destination for the first data frame before the first thread is scheduled-out from the first processor core and the cache register of the second processor core as the stash destination for the first data frame when the first thread is scheduled-in to the second processor core and the stash replay command is generated.

In another embodiment of the present invention, a method for migrating at least one stash transaction between a plurality of processor cores of a multi-core processor system using an input/output memory management unit (IOMMU) mapping table is provided. The IOMMU mapping table includes a mapping between an input/output (I/O) device and a corresponding stash transaction destination identification (ID). The stash transaction destination ID includes a cache register ID associated with a cache register of one of the processor cores of the plurality of processor cores. The method includes generating a first stash transaction request corresponding to a first data frame of the plurality of data frames by a first I/O device. The first stash transaction request is stored. A first stash transaction command is generated based on the first stash transaction request. The method further includes determining a first stash transaction destination ID as a stash destination for the first stash transaction command by accessing the IOMMU mapping table, wherein the first stash transaction destination ID includes a first cache register ID associated with a cache register of a first processor core of the plurality of processor cores when the first processor core executes a first thread associated with the first I/O device. The first data frame is stored in the cache register of the first processor core based on the first stash transaction command when the first processor core executes the first thread. A first processor core ID corresponding to the first processor core is determined when the first thread is scheduled-out from the first processor core. A second processor core ID corresponding to a second processor core that executes the first thread after the first thread is scheduled-in to the second processor core is determined. The first and second processor core IDs are compared. The method further includes updating the IOMMU mapping table corresponding to the first I/O device when the first and second processor core IDs are different to replace the first stash transaction destination ID with a second stash transaction destination ID, wherein the second stash transaction destination ID includes a second cache register ID associated with a cache register of the second processor core. A stash replay command is generated when the first and second processor core IDs are different. The first stash transaction command corresponding to the first stash transaction request is re-generated. The method further includes determining the second stash transaction destination ID as the stash destination for the re-generated first stash transaction command by accessing the updated IOMMU mapping table when the second processor core executes the first thread. The first data frame is stored in the cache register of the second processor core based on the re-generated first stash transaction command when the second processor core executes the first thread.

Various embodiments of the present invention provide a system and method for migrating at least one stash transaction between a plurality of processor cores of a multi-core processor system. The system includes a main memory, a first I/O device, a queue manager, a stash transaction migration management unit (STMMU), and an input/output memory management unit (IOMMU). The main memory stores a plurality of data frames and an IOMMU mapping table that includes a mapping between a logical input/output (I/O) device number (LIODN) corresponding to an I/O device and a corresponding stash transaction destination identification (ID). The stash transaction destination ID includes a cache register ID associated with a cache register of one of the processor cores of the plurality of processor cores. The first I/O device generates the plurality of data frames and initiates direct memory access (DMA) transactions for storing the plurality of data frames in the main memory, and generates a stash transaction request corresponding to each data frame of the plurality of data frames. The queue manager receives and stores a first stash transaction request corresponding to a first data frame of the plurality of data frames, generates a first stash transaction command based on the first stash transaction request, and re-generates the first stash transaction command when a stash replay command is received. The STMMU determines a first processor core ID of a first processor core that executes a first thread associated with the first I/O device when the first thread is scheduled-out from the first processor core, determines a second processor core ID of a second processor core that executes the first thread after the first thread is scheduled-in, compares the first and second processor core IDs, updates a stash transaction destination ID field of the IOMMU mapping table corresponding to the first I/O device when the first and second processor core IDs are different by replacing a first stash transaction destination ID with a second stash transaction destination ID, and generates the stash replay command when the first and second processor core IDs are different, wherein the first stash transaction destination ID includes a first cache register ID associated with a cache register of the first processor core and the second stash transaction destination ID includes a second cache register ID associated with a cache register of the second processor core. The IOMMU validates the DMA transactions initiated by the first I/O device using a LIODN associated with the first I/O device, and determines a stash destination for the first stash transaction command received from the queue manager by accessing the IOMMU mapping table. The IOMMU determines the cache register of the first processor core as the stash destination for the first data frame before the first thread is scheduled-out from the first processor core and the cache register of the second processor core as the stash destination for the first data frame when the first thread is scheduled-in to the second processor core and the stash replay command is generated. Updating the IOMMU mapping table enables any subsequent stash transactions that are originated by the first I/O device to be redirected to the second processor core, which executes the first thread after migration. Further, the stash replay command enables the stashing of data frames stashed to the first processor core before thread migration to the second processor core after thread migration. Thus, the second processor core can access the data frames stashed to the first processor core without performing a snooping operation of the stashed data frames from the first processor core. Therefore, the time required for executing the migrated first thread reduces and the performance of the multi-core processor system increases. Enabling thread migration further leads to effective load balancing and power management in the multi-core processor systems.

Referring now to FIG. 1, a schematic block diagram of a system for migrating stash transactions between a plurality of processor cores of the multi-core processor system 100 in accordance with an embodiment of the present invention is shown. The multi-core processor system 100 includes a main memory 102, an input/output (I/O) device 104, a queue manager 106, a stash replay buffer 108, an input output memory management unit (IOMMU) 110, a system bus 112, an operating system (OS) scheduler 114, and first and second processor cores 116a and 116b. The first processor core 116a includes a first cache register 118a having a first cache register ID associated with it. The second processor core 116b includes a second cache register 118b having a second cache register ID associated with it and a stash transaction migration management unit (STMMU) 120. The multi-core processor system 100 includes network interfaces such as Ethernet ports or wireless local area network (WLAN) interfaces that receive data packets from a communication network (not shown) external to the multi-core processor system 100. Further, some data packets are generated within the multi-core processor system 100 by one of the first and second processor cores 116a and 116b.

The main memory 102 includes an external buffer 122 and an IOMMU mapping table 124. The external buffer 122 stores a plurality of data frames (hereinafter referred to as "data frames"). The data frames correspond to the data packets and are queued in the multi-core processor system 100 for processing by at least one of the first and second processor cores 116a and 116b. The IOMMU mapping table 124 includes a mapping between logical input output device numbers (LIODNs) of one or more I/O devices, e.g., the I/O device 104, and one or more stash transaction destination IDs. The stash transaction destination IDs include cache register IDs, e.g., the first and second cache register IDs associated with the first and second cache registers 118a and 118b. The stash transaction destination IDs provide directions to one or more data frames received from the one or more I/O devices that need to be transmitted to the first and second cache registers 118a and 118b during stash transactions. Stashing of the one or more data frames in the first and second cache registers 118a and 118b enables faster data access, thereby reducing latency and improving processing speed of the multi-core processor system 100. In an embodiment of the present invention, the IOMMU mapping table 124 is stored in a fast or low latency memory such as a cache memory chip that is separate from the main memory 102 but accessible to the STMMU 120. In an example, a first stash transaction destination ID associated with the I/O device 104 includes the first cache register ID associated with the first cache register 118a.

The I/O device 104 is connected to the main memory 102 by way of the IOMMU 110 and the system bus 112. The I/O device 104 receives the data packets from the network interfaces and the first and second processor cores 116a and 116b, and generates the data frames corresponding to the data packets. The I/O device 104 further initiates direct memory access (DMA) transactions for storing the data frames in the external buffer 122. The I/O device 104 generates a stash transaction request corresponding to each data frame to initiate stashing of the data frames to the first and second cache registers 118a and 118b. In an embodiment of the present invention, the stash transaction requests are generated and transmitted to the queue manager 106 by way of a plurality of buffer descriptors (BDs, not shown) of a BD ring (not shown). The I/O device 104 associates free BDs of the BD ring with each data frame by updating status and control bits of the free BDs. When the BD ring is updated, the queue manager 106 is notified that the data frames have been queued in the BD ring for processing by at least one of the first and second processor cores 116a and 116b. In an example, the I/O device 104 receives a first data packet and generates a first data frame. The I/O device 104 generates a first DMA transaction to store the first data frame in the external buffer 122. The I/O device 104 further generates a first stash transaction request associated with the first data frame.

The queue manager 106 is connected to the I/O device 104 and the stash replay buffer 108. The queue manager 106 receives the stash transaction requests generated by the frame manager 104 and stores the stash transaction requests in the stash replay buffer 108. The queue manager 106 generates stash transaction commands based on the stash transaction requests. Further, the queue manager 106 re-generates the stash transaction commands corresponding to the stored stash transaction requests when a stash replay command is received. The queue manager 106 deletes the stash transaction requests corresponding to the consumed data frames from the stash replay buffer when a stash clear command is received. In an embodiment of the present invention, the stash replay buffer 108 is functionally similar to a stack and operates as a last-in-first-out (LIFO) memory. The stash replay buffer 108 may also be implemented using a cache memory in the queue manager 106. In another embodiment of the present invention, the queue manager 106 receives the stash replay command and re-generates the stash transaction commands based on data frame consumption rate of the second processor core 116b that executes a thread associated with the data frame. In an example, the queue manager 106 receives the first stash transaction request corresponding to the first data frame. The queue manager 106 stores the first stash transaction request in the stash replay buffer 108. The queue manager 106 generates a first stash transaction command based on the first stash transaction request. When the queue manager 106 receives the stash replay command, the queue manager 106 retrieves the first stash transaction request stored in the stash replay buffer 108 and re-generates the first stash transaction command. When the queue manager 106 receives the stash clear command, the queue manager 106 deletes the first stash transaction request stored in the stash replay buffer 108.

The IOMMU 110 is connected to the main memory 102 and the first and second processor cores 116a and 116b by way of the system bus 112, the I/O device 104, and the queue manager 106. The IOMMU 110 receives and validates the DMA transactions initiated by the one or more I/O devices using a LIODN associated with the one or more I/O devices. The DMA transaction initiated by the I/O device 104 is validated by the IOMMU 110 by searching for an entry in the IOMMU mapping table 124 corresponding to the LIODN of the I/O device 104. Upon successful validation of the DMA transaction, the data frames are copied into the external buffer 122. The IOMMU 110 accesses the IOMMU mapping table 124 and determines stash destinations for the stash transaction commands received from the queue manager 106 by accessing the IOMMU mapping table 124. In an example, the IOMMU 110 receives the first DMA transaction and stores the first data frame in the external buffer 122. The IOMMU 110 also receives the first stash transaction command and determines the first cache register 118a as the stash destination for the first data frame.

The first and second processor cores 116a and 116b execute threads that correspond to one or more data frames originated by one or more I/O devices, e.g., the I/O device 104. The OS scheduler 114 periodically migrates the threads between the first and second processor cores 116a and 116b based on a predetermined set of conditions. In an embodiment of the present invention, the predetermined set of conditions may relate to load distribution and power management across the first and second processor cores 116a and 116b. In an example, the first processor core 116a executes a first thread. Thus, before thread migration, the IOMMU stashes the first data frame to the first cache register 118a. The OS scheduler 114 schedules-out the first thread corresponding to the I/O device 104, executing on the first processor core 116a and schedules the first thread to the second processor core 116b for execution to obtain better load balancing or power management. The details of thread migration are generally understood by those of skill in the art and further explanation thereof is not required for a complete understanding of the present invention. The OS scheduler 114 generates pre-empt notifiers when it schedules-out/schedules-in the first thread. In the above example, when the first thread is scheduled-out from the first processor core 116a, the OS scheduler 114 generates a schedule-out pre-empt notifier. The schedule-out pre-empt notifier includes a first processor core identification (ID) corresponding to the first processor core 116a. Thereafter, when the first thread is scheduled-in to the second processor core 116b, the OS scheduler 114 generates a schedule-in pre-empt notifier that includes a second processor core ID corresponding to the second processor core 116b. The second processor core 116b generates the stash clear command when the first thread executing on the second processor core 116b consumes the first data frame.

The STMMU 120 manages the migration of the stashed data frames between the first and second processor cores 116a and 116b. In the above example, the STMMU 120 detects migration of the first thread by detecting the generation of the pre-empt notifiers. The STMMU 120 extracts the first and second processor core IDs from the pre-empt notifiers and compares these two processor core IDs. Since the first thread is migrated to a different processor core, i.e., the second processor core 116b, the STMMU 120 determines that the first and second processor core IDs are different. Therefore, the STMMU 120 updates the IOMMU mapping table 124 stored in the main memory 102 by replacing the first stash transaction destination ID with a second stash transaction destination ID. The second stash transaction destination ID includes the second cache register ID associated with the second cache register 118b. Hence, the subsequent stash transactions originating from the I/O device 104 are redirected to the second processor core 116b. Therefore, all the data frames subsequent to the first data frame are stashed to the second cache register 118b. A simple comparator may be used to compare the processor core IDs and determine whether or not they are the same or different. Further, the STMMU 120 generates the stash replay command to re-generate the first stash transaction command, thereby stashing the first data frame to the second processor core 116b. Similarly, the data frames that were stashed to the first cache register 118a before migration of the first thread from the first processor core 116a to the second processor core 116b are stashed to the second cache register 118b. Thus, the second processor core 116b can access the data frames that were stashed to the first cache register 118a without performing a snooping operation of the stashed data frames from the first cache register 118a. Therefore, the time required for executing the migrated first thread by the second processor core 116b reduces and the performance of the multi-core processor system 100 increases. Further, enabling thread migration leads to effective load balancing and power management in the multi-core processor system 100.

In various embodiments of the present invention, the first and second processor cores 116a and 116b communicate with the IOMMU 110, the main memory 102, the queue manager 106, and the I/O device 104 through the system bus 112.

Figure 2A:
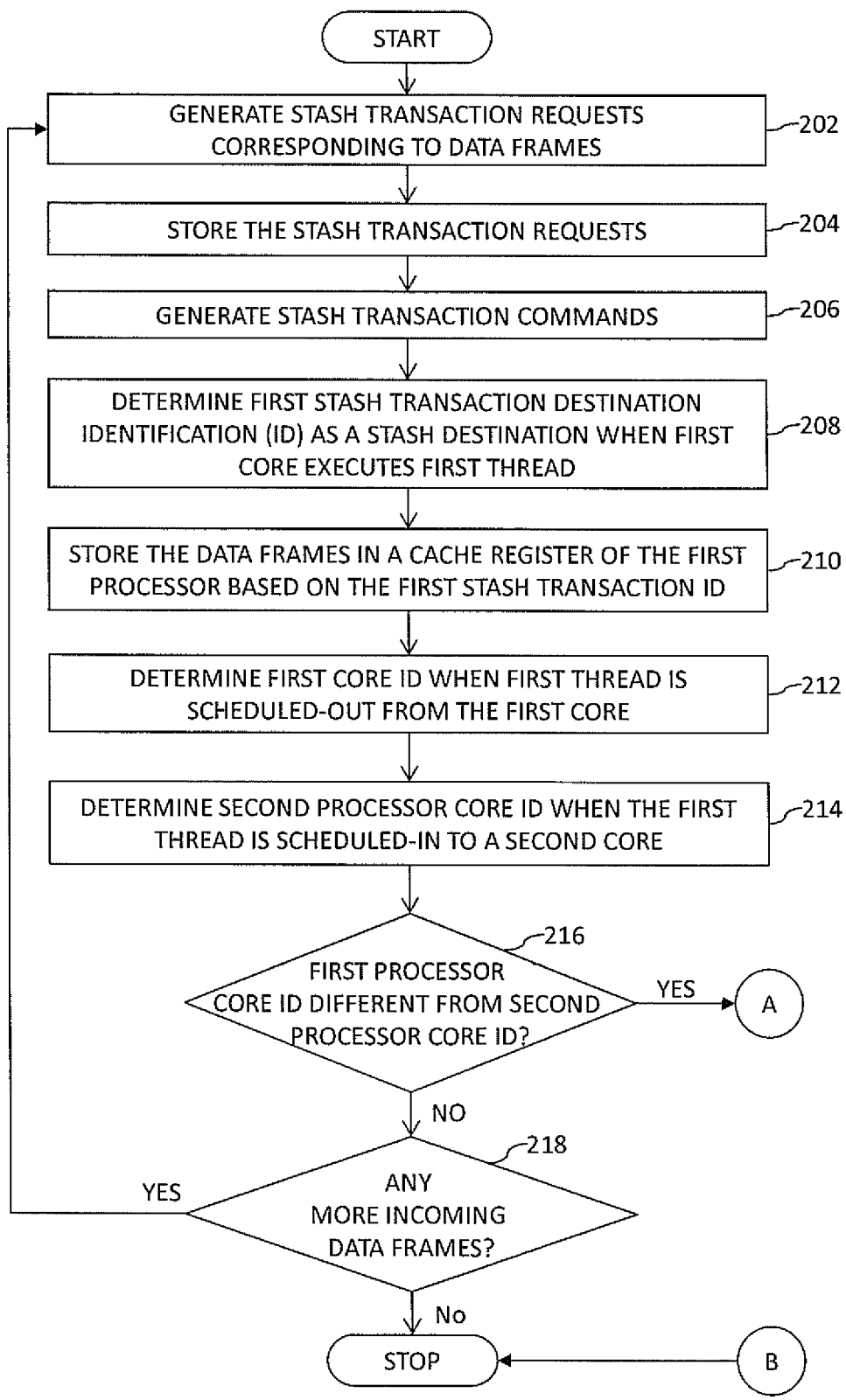
FIGS. 2A and 2B are a flow chart illustrating a method for migrating stash transactions between a plurality of processor cores of a multi-core processor system, in accordance with an embodiment of the present invention.
Figure 2B:
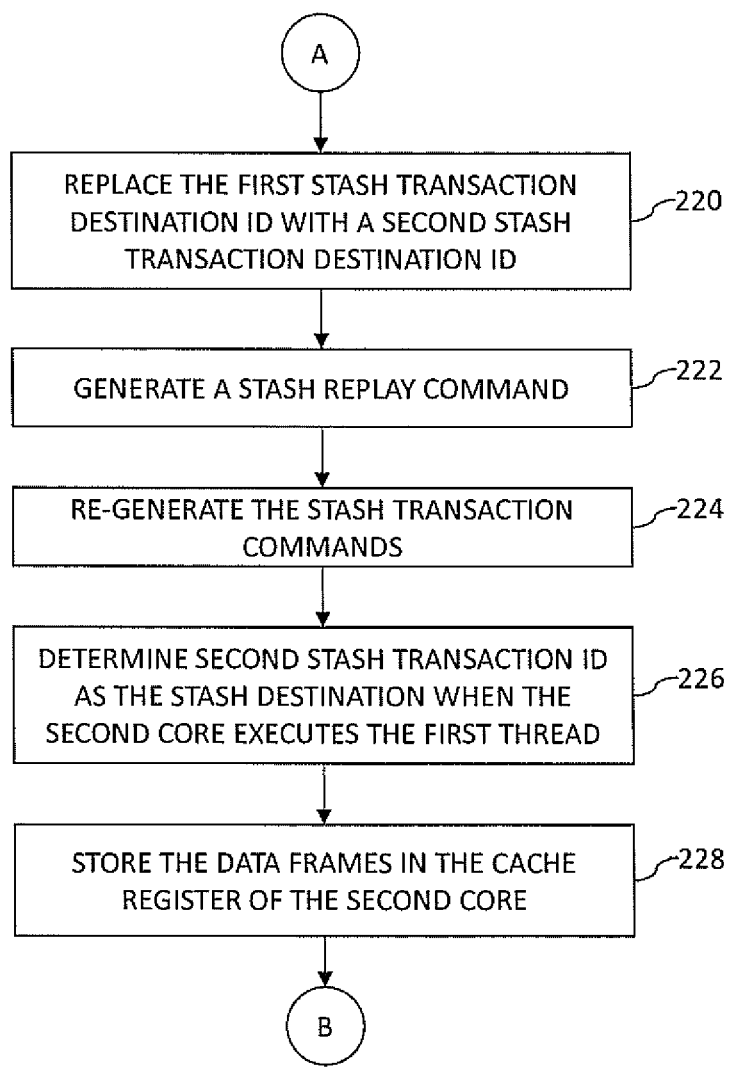

Referring now to FIGS. 2A and 2B, a flowchart illustrating a method for migrating stash transactions between a plurality of processor cores of a multi-core processor system 100 in accordance with an embodiment of the present invention is shown. FIGS. 2A and 2B will be explained below in conjunction with FIG. 1.

At step 202, the I/O device 104 generates the stash transaction requests corresponding to the data frames. At step 204, the queue manager 106 stores the stash transaction requests in the stash replay buffer 108. At step 206, the queue manager 106 generates the stash transaction commands based on the stash transaction requests. At step 208, the IOMMU 110 accesses the IOMMU mapping table 124 to determine the first stash transaction destination ID as the stash destination when the first processor core 116a is executing the first thread. The first stash transaction destination ID includes the first cache register ID associated with the first cache register 118a. At step 210, the IOMMU 110 stores the data frames in the first cache register 118a of the first processor core 116a. At step 212, the STMMU 120 determines the first processor core ID when the first thread is scheduled-out from the first processor core 116a. At step 214, the STMMU 120 determines the second processor core ID when the first thread is scheduled-in to the second processor core 116b. At step 216, the STMMU 120 checks whether the first processor core ID is different from the second processor core ID. If at step 216, the STMMU 120 determines that the first processor core ID is different from the second processor core ID, step 220 is executed.

At step 220, the STMMU 120 replaces the first stash transaction destination ID with the second stash transaction destination ID. The second stash transaction destination ID includes the second cache register ID associated with the second cache register 118b. At step 222, the STMMU 120 generates the stash replay command. At step 224, the queue manager 106 receives the stash replay command and re-generates the stash transaction commands corresponding to the stored stash transaction requests. At step 226, the IOMMU 110 accesses the IOMMU mapping table 124 to determine the second stash transaction destination ID as the stash destination when the second processor core 116a is executing the first thread. At step 228, the IOMMU 110 stores the data frames in the second cache register 118b of the second processor core 116b.

However, if at step 216, the STMMU 120 determines that the first processor ID is not different from the second processor core ID, step 218 is executed. At step 218, the queue manager 106 checks for the incoming stash transaction requests associated with the incoming data frames. If at step 218, the queue manager 106 determines that there are more incoming stash transaction requests, step 202 is executed.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for migrating at least one stash transaction between a plurality of processor cores, wherein each of the plurality of processor cores includes a cache register, the system comprising:
   a main memory, for storing a plurality of data frames and an input/output memory management unit (IOMMU) mapping table that includes a mapping between a logical input/output (I/O) device number (LIODN) corresponding to an I/O device and a corresponding stash transaction destination identification (ID), wherein the stash transaction destination ID includes a cache register ID associated with a cache register of one of the processor cores of the plurality of processor cores;
   a first I/O device, connected to the main memory, for generating the plurality of data frames and initiating direct memory access (DMA) transactions for storing the plurality of data frames in the main memory, and generating a stash transaction request corresponding to each data frame of the plurality of data frames;
   a queue manager, connected to the first I/O device, for receiving and storing a first stash transaction request corresponding to a first data frame of the plurality of data frames, generating a first stash transaction command based on the first stash transaction request, and re-generating the first stash transaction command when a stash replay command is received;
   a stash transaction migration management unit (STMMU), connected to the main memory and the queue manager, for determining a first processor core ID of a first processor core that executes a first thread associated with the first I/O device when the first thread is scheduled-out from the first processor core, determining a second processor core ID of a second processor core that executes the first thread after the first thread is scheduled-in, comparing the first and second processor core IDs, updating a stash transaction destination ID field of the IOMMU mapping table corresponding to the first I/O device when the first and second processor core IDs are different by replacing a first stash transaction destination ID with a second stash transaction destination ID, and generating the stash replay command when the first and second processor core IDs are different, wherein the first stash transaction destination ID includes a first cache register ID associated with a cache register of the first processor core and the second stash transaction destination ID includes a second cache register ID associated with a cache register of the second processor core; and
   an IOMMU, connected to the main memory, the first I/O device, the queue manager, and the plurality of processor cores, for validating the DMA transactions initiated by the first I/O device using a LIODN associated with the first I/O device, and determining a stash destination for the first stash transaction command received from the queue manager by accessing the IOMMU mapping table, wherein the IOMMU determines the cache register of the first processor core as the stash destination for the first data frame before the first thread is scheduled-out from the first processor core and the cache register of the second processor core as the stash destination for the first data frame when the first thread is scheduled-in to the second processor core and the stash replay command is generated.

2. The system of claim 1, wherein the queue manager comprises a stash replay buffer that stores the first stash transaction request.

3. The system of claim 2, wherein the second processor core generates a stash clear command when the first data frame is consumed by the first thread that is executed on the second processor core.

4. The system of claim 3, wherein the queue manager further receives the stash clear command and deletes the first stash transaction request from the stash replay buffer.

5. The system of claim 1, wherein the queue manager receives the stash replay command and re-generates the first stash transaction command based on a data frame consumption rate of the second processor core that executes the first thread.

6. The system of claim 1, wherein the STMMU is connected to an operating system (OS) scheduler for receiving pre-empt notifiers generated when the first thread is scheduled-in and scheduled-out.

7. The system of claim 6, wherein the STMMU determines the first and second processor core IDs using the pre-empt notifiers generated by the OS scheduler.

8. The system of claim 7, wherein the STMMU executes in at least one of the plurality of processor cores.

9. The system of claim 1, wherein the first I/O device is a frame manager.

10. The system of claim 1, wherein the IOMMU validates the DMA transactions by searching for an entry in the IOMMU mapping table corresponding to the LIODN of the first I/O device.

11. The system of claim 1, wherein the IOMMU is connected to the main memory, the first I/O device, the queue manager, and the plurality of processor cores by way of a system bus.

12. A method for migrating at least one stash transaction between a plurality of processor cores of a multi-core processor system using an input/output memory management unit (IOMMU) mapping table, wherein the IOMMU mapping table includes a mapping between an input/output (I/O) device and a corresponding stash transaction destination identification (ID), and wherein the stash transaction destination ID includes a cache register ID associated with a cache register of one of the processor cores of the plurality of processor cores, the method comprising:
   generating a first stash transaction request corresponding to a first data frame of the plurality of data frames by a first I/O device;
   storing the first stash transaction request;
   generating a first stash transaction command based on the first stash transaction request;
   determining a first stash transaction destination ID as a stash destination for the first stash transaction command by accessing the IOMMU mapping table, wherein the first stash transaction destination ID includes a first cache register ID associated with a cache register of a first processor core of the plurality of processor cores when the first processor core executes a first thread associated with the first I/O device;

storing the first data frame in the cache register of the first processor core based on the first stash transaction command when the first processor core executes the first thread;

determining a first processor core ID corresponding to the first processor core when the first thread is scheduled-out from the first processor core;

determining a second processor core ID corresponding to a second processor core that executes the first thread after the first thread is scheduled-in to the second processor core;

comparing the first and second processor core IDs;

updating the IOMMU mapping table corresponding to the first I/O device when the first and second processor core IDs are different to replace the first stash transaction destination ID with a second stash transaction destination ID, wherein the second stash transaction destination ID includes a second cache register ID associated with a cache register of the second processor core;

generating a stash replay command when the first and second processor core IDs are different;

re-generating the first stash transaction command corresponding to the first stash transaction request;

determining the second stash transaction destination ID as the stash destination for the re-generated first stash transaction command by accessing the updated IOMMU mapping table when the second processor core executes the first thread; and storing the first data frame in the cache register of the second processor core based on the re-generated first stash transaction command when the second processor core executes the first thread.

13. The method of claim 12, wherein the first stash transaction request is stored in a stash replay buffer.

14. The method of claim 13, further comprising generating a stash clear command when the first data frame is consumed by the first thread that is executed on the second processor core.

15. The method of claim 14, further comprising deleting the first stash transaction request from the stash replay buffer based on the stash clear command.

16. The method of claim 12, wherein the first stash transaction command is re-generated based on a data frame consumption rate of the second processor core that executes the first thread.

17. The method of claim 12, further comprising generating pre-empt notifiers when the first thread is scheduled-in and scheduled-out by the OS scheduler.

18. The method of claim 17, wherein the pre-empt notifiers include the first and second processor core IDs when the first thread is scheduled-out from the first processor core and scheduled-in to the second processor core.

* * * * *